United States Patent Office 2,960,193
Patented Nov. 15, 1960

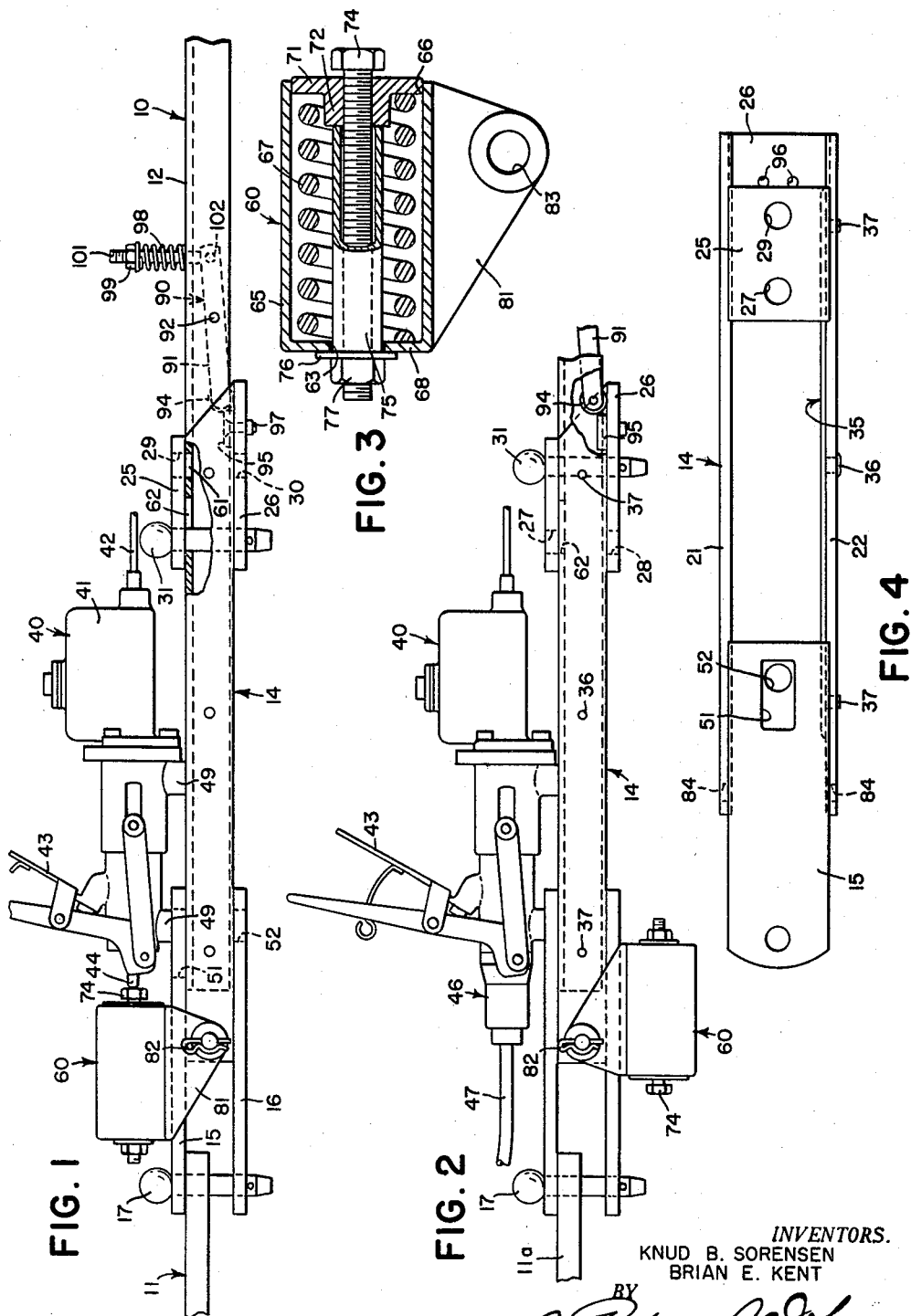

2,960,193

TRAILER BRAKE ACTUATING MECHANISM

Knud B. Sorensen, Rock Island, and Brian E. Kent, Moline, Ill., assignors, by mesne assignments, to Deere & Company, a corporation of Delaware Filed Dec. 24, 1956, Ser. No. 630,173

7 Claims. (Cl. 188—112)

The present invention relates generally to brake actuating devices, especially for agricultural implements, such as wagons, trailers, and the like that may be connected either to a farm tractor or to a motor truck.

The object and general nature of the present invention is the provision of brake applying mechanism for trailers and the like in which the brakes may be applied, either from the hydraulic brake system of a conventional farm truck, or optionally by the forward surge or overrun of a trailer relative to a farm tractor that ordinarily does not have a braking system of the type that can be extended to trailing implements. A further feature of the invention is the provision of new and improved mechanism for connecting a trailer having hydraulic brakes and a brake-applying means, adapted to be operated from the braking system of a truck or the like having hydraulic brake means, to a conventional farm tractor by means that is so constructed and arranged as to be responsive to the forward movement of the trailer relative to the tractor and which means is connected so as to apply the brakes, by virute of such overrun, through the more or less conventional braking system and brake applying means of the trailer.

A further feature of this invention is the provision of brake actuating mechanism that includes a spring cushion stop whereby the brake applying means of the trailer is protected from excessive loads and the like. Still further, it is a feature of this invention to provide means whereby the spring cushion stop may be disposed in an inoperative position, but generally instantly available when desired, when the trailer is to be connected to a farm truck or other type of pulling vehicle having a braking system of the type that can be connected into the brake applying means of the trailer.

Still further, it is another feature of this invention to provide detent means of the spring biased type which acts to prevent minor surges of the trailer relative to the tractor from operating the brakes of a trailer. Additionally, according to the present invention, such means makes it possible for the operator to back the tractor and as a consequence thereof back the trailer up a small incline or under other conditions where the backing force is not excessive, without locking out the surge responsive brake applying means. Additionally, it is a feature of this invention to provide easily and conveniently operated means for locking out the surge responsive brake applying means whenever it is desired to do so.

An additional feature of this invention is the provision of telescopically associated hitch members, one of which is a standard channel and the other of which is a part embracing the same, with new and improved means for accommodating variations in the outside dimension of the channels so as to provide the desired telescoping action while at the same time eliminating unnecessary lateral looseness.

These and other objects and advantages of the present invention will be apparent to those skilled in the art after a consideration of the following detailed description, taken in conjunction with the accompanying drawings, in which:

Fig. 1 is a side view of the hitch pole and associated structure, such as a trailer brake applying means, with said responsive brake actuating mechanism incorporated therewith.

Fig. 2 is a view, somewhat fragmentary in nature similar to Fig. 1, showing the surge responsive brake actuating mechanism disposed in an inoperative position in order to permit actuation of the trailer brake system from the brake system of a farm truck or other propelling vehicle having its own hydraulic brakes, the surge responsive brake actuating unit being shown in an inactive position but one in which it is immediately accessible for installation in a brake actuating position whenever the trailer is to be connected to a tractor or other propelling agency which does not have its own hydraulic brake system.

Fig. 3 is a sectional view taken though the spring cushion stop unit that forms the principal portion of the surge responsive brake actuating means of the present invention.

Fig. 4 is a fragmentary plan view of the forwardly disposed shiftable part that is telescopically associated with the hitch pole of the trailer.

Referring first to Figs. 1 and 2, the principles of the present invention have been shown as incorporated in a tractor-trailer outfit in which the trailer is represented by a forwardly extending hitch pole 10 and in which the tractor is represented by the rearwardly extending drawbar 11, these parts being conventional so far as the present invention is concerned, the hitch pole 10 being in the form of a channel 12. The tractor drawbar 11 is connected with the pole 10 though a fore-and-aft shiftable part 14 that at its forward end carries upper and lower hitch plates 15 and 16, the forward ends of which are apertured to receive a hitch pin 17 to which the tractor drawbar 11 is connected. Preferably, the rear ends of the hitch plates 15 and 16 are welded or otherwise rigidly fixed to a pair of rearwardly extending side bars 21 and 22 (Fig. 4), and the rear ends of the side bars 21 and 22 are rigidly interconnected by upper and lower rear plates 25 and 26. These plates are apertured to provide a forward pair of aligned openings 27 and 28 and a second pair of aligned openings 29 and 30, a hitch pin 31 being disposable optionally in either pair of openings. The forward portion of the channel 12 is slidably associated with the part 14 and generally lies between the front plates 15 and 16 and the rear plates 25 and 26, and also between the side plates 21 and 22. Standard mill practice tolerates appreciable differences in lateral dimensions of the channel 12, and in order to provide a smooth telescoping fit between the parts 12 and 14, we provide a relatively thin binder plate bearing member 35, the generally central portion of which is welded, as at 36, to the side plate 22, the latter having an opening to facilitate this connection. Adjacent the ends of the plate 35, the side bar 22 carries set screws 37 by which the ends of the plate 35 may be adjusted toward or away from the channel 12 so as to adjust for the clearance between the channel 12 and the sides of the member 14.

Mounted on the forward end of the pole 10 is a brake applying means 40. This unit is conventional, so far as the present invention is concerned, and incorporates the construction shown in U.S. Patent 2,704,585 that issued March 22, 1955, to Olof E. E. Stromberg, to which reference may be made if necessary. Briefly, the unit 40 includes a master cylinder unit 41 that is connected with the brakes of the trailer through hydraulic hose line means 42. The forward portion of the unit 40 includes means for actuating the piston of the master cylinder 41, such means including spring mechanism under the control of the trip lever 43, and a fore-and-aft extending plunger 44 that, as shown in Fig. 1, is so arranged that when moved rearwardly it acts to operate the master cylinder 41 and direct fluid through the brake lines 42 to the brakes of the trailer. Conventionally, such brake applying means as indicated at 40 is usually accompanied by a coupling cylinder 46 and a conduit 47 that is connected into the hydraulic brake system of a farm truck, the coupling 46 being readily disconnectible from the front end of the unit 40 so as to expose the plunger 44, as shown in Fig. 1, for actuation by means other than the coupling cylinder 46. The forward portion of the unit 40 is rigidly mounted on the forward end of the pole or channel 10 by means of a pair of attaching lugs 49 that are tapped to receive attaching fasteners of any suitable construction. To accommodate the forwardmost lug 49, as shown in Fig. 1, the upper forward hitch plate 15 is provided with a fore-and-aft extending aperture 51, and to provide for access to the fastener associated with the forwardmost lug 49, the lower forward hitch plate 16 is apertured, as at 52. The fasteners associated with the lugs 49 are conventional and hence have not been specifically shown in the drawings. The above-mentioned Stromberg patent shows fasteners of the type that may be utilized for fixing the unit 40 to the forward end of the channel 12.

When it is desired to pull the trailer by means such as a conventional farm tractor or other instrumentality that does not have its own hydraulic brakes, there is no means into which the coupling cylinder 46 and connection 47 can be connected, and therefore the brake applying means 40 cannot be actuated by the means 46, 47 shown in Fig. 2. In order to operate through the unit 40, while employing a conventional farm tractor to pull the trailer, we provide a surge-responsive mechanism for applying the brakes of the trailer whenever the latter starts to overrun the tractor, which mechanism includes a spring cushion stop unit 60 that can readily be attached to the part 14. It should be mentioned at this point that the member 14 can be connected for telescoping movement relative to the channel 12 whenever desired, but when the coupling cylinder 46 and associated parts are connected to the unit 40 to operate the same from the hydraulic brake system of a propelling truck, it is necessary to connect the part 14 to the channel 12 by means that does not accommodate any telescoping action. To this end, the hitch pin 31 is disposed in the rearmost openings 29 and 30, in which position the pin extends through an opening 61 in the central web of the channel 12, which opening 61 is substantially the same size and configuration of the openings 29 and 30. If telescoping action is desired, as when using the unit 60 just mentioned, the pin 31 is disposed in the forward openings 27 and 28, in which position the pin 31 extends through an elongated opening 62 in the channel 12. By virtue of the length of the opening 62, the member 14 may move fore-and-aft relative to the channel 12. The forward end of the part 14 as shown in Fig. 2 is connected with the associated farm truck by means of a drawbar 11a. The same pin 17 may be used, irrespective of whether the trailer is connected with the farm truck or a farm tractor.

The spring cushion stop unit 60, as best shown in Fig. 3, includes a casing 65 having one end open, as shown at 66, and the other end closed but provided with a central opening 63. A relatively heavy cushion spring 67 is disposed within the casing, one end bearing against the closed end of the casing, as indicated at 68. A spring mounting block 71 is disposed in the open end 66 of the casing and includes a reduced portion 72 that receives the other end of the spring 67. The mounting block 71 is threaded to receive a bolt member 74. The latter and a spacing sleeve 75 extend outwardly through the opening 63 in the casing. The spacing sleeve 75 extends to the outer face of the adjacent end of the casing 65 and receives an abutment collar 76 that is held against the adjacent end of the spacing sleeve 75 by a nut member 77. It will be noted that when the nut is turned down tight against the abutment washer 76, the latter, the spacing sleeve 75, and the block 71 are held in fixed relationship, which thus determines the amount of prestress that is placed in the cushion spring 67. Generally speaking, the spring 67 is held compressed to an extent sufficient to exert a force appreciably greater than that normally required to operate the brake applying plunger 44 of the unit 40. The head of the bolt 74 is disposed so as to contact the plunger 44 whenever the part 14 moves rearwardly relative to the pole or channel 10. The axial position of the bolt 74 can be adjusted relative to the block 71 and spacing sleeve 75, by loosening the nut 77, turning the bolt in one direction or the other relative to the mounting block 71, and then retightening the nut 77.

The unit 60 is mounted on the part 14 by means of a pair of apertured side sections 81. These parts are so dimensioned that when a releasable pin 82 is passed through the openings 83 in the apertured side sections 81 and through corresponding openings 84 (Fig. 4) in the forward ends of the side bars 21 and 22, the lower central portion of the casing 60 is held against the upper face of the upper hitch plate 15. Preferably, the openings 84 are disposed midway between the upper and lower faces of the upper and lower hitch plates 15 and 16, and therefore when the pin 82 is removed and the unit 60 shifted to the underside of the member 14, as shown in Fig. 2, and the pin 82 then reinserted through the associated openings, the unit 60 is held in a position of storage beneath the forward end of the part 14 but in such a position as to be substantially instantly available whenever it is desired to bring the same into operating position, as shown in Fig. 1.

In the extended position of the part 14 relative to the front end of the pole 10, the pin 31 engages the forward end of the elongated opening 62 and in this position transmits the draft pull from the tractor drawbar 11 to the pole 10. If the trailer starts to overrun the tractor, the part 14 will move rearwardly relative to the pole 10 and as a consequence thereof the unit 60 will act through the bolt 74 to apply a rearward force to the plunger 44, thus acting through the unit 40 to apply the brakes of the trailer. In order to prevent relatively minor surges of the trailer against the tractor from applying the brakes when it is not desired to do so, we provide a detent mechanism indicated in its entirety by the reference numeral 90. This mechanism includes a lever 91 pivoted at 92 to the side flanges of the channel 12. The forward end of this lever 91 carries a roller 94 that bears against a relatively small abutment block 95 that is fixed, as by a pair of bolts 97 or the like extending through openings 96 formed in the lower hitch plate 26. The rollers are held against the abutment plate 95 by means of a spring 98 confined between the upper face of the channel 12 and adjusting nut 99 that is carried by the upper end of an eye bolt 101, the lower end of which is pivotally connected, as at 102, with the rear end of the lever 91. By adjusting the nut 99 to the proper degree, the spring 98 can be compressed so that the part 14 does not move rearwardly relative to the pole 10 except upon the occurrence of an appreciable overrunning force. For example, with the proper adjustment of the nut 99, the tractor may be used to back the trailer up a small incline or under the conditions where the backing force is not excessive, without having to lock out the telescoping movement of the part 14. Yet, under most conditions, when the trailer starts to overrun the tractor to more than a minor degree, the resistance offered by the lever 91 and associated parts is overcome and the part 14 moves rearwardly relative to the pole 10 and applies the brakes, as described above.

Of course, it is possible at any time to lock out the telescopic movement of the member 14 relative to the member 10 merely by shifting the hitch pin 31 from the position shown in Fig. 1 to the position shown in Fig. 2.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a tractor-trailer combination having a trailer brake actuating system, wherein the trailer includes a hitch pole on which brake-applying means is carried, said brake-applying means including a member accessible to a detachable actuating means of the type to be connected with and actuated by the braking system of the tractor, the improvement that comprises a part normally shiftable relative to the pole, means to connect said shiftable part with the tractor, an actuating stop detachably mounted on said part in a position to engage and shift said brake-applying member when the trailer starts to overrun the tractor to provide thereby a surge brake actuation, and means to lock said part to the pole so as to lock out shifting movement of said part relative to the pole to accommodate disconnection of said actuating stop and attachment of the detachable actuating means of the tractor to said brake applying means so as to provide for brake actuation from the tractor.

2. The invention set forth in claim 1, further characterized by said detachable stop comprising a member having apertured sides extended so as to at least partially embrace said part and disposable at the upper side of said part in first position to engage said brake-applying member, and attaching means on said part generally midway between the upper and lower faces of said part whereby said stop may be stored at the lower side of said part so as to accommodate actuation of the brake-applying means by said tractor-connected brake-actuated means but available for reconnection to said shiftable part when surge brake actuation is desired.

3. In a hydraulic surge brake system for trailers, wagons and the like including a pole connected to the trailer, wagon or the like and carrying brake-applying means including a plunger, the combination comprising a part adapted to be connected with a tractor and shiftably connected with said pole, a plunger-engaging stop connected with said part optionally in either of two positions, one engageable with said plunger to actuate said brake-applying means upon movement of said part relative to said pole and the other position being one in which said stop is carried underneath said part adjacent the forward portion thereof, said part comprising a pair of side bars disposed on opposite sides of said pole and the brake-applying means carried thereby, hitch plate means connecting the forward portions of said side bars, and upper and lower plates embracing said pole in rear of said brake-applying means and fixed to the rear ends of said side bars and means connecting said rear plates with said pole to lock out shifting movement of said part when said stop is in said other position.

4. In a hydraulic surge brake system for trailers, wagons and the like including a pole connected to the trailer, wagon or the like and carrying brake-applying means including a plunger, the improvement comprising a part adapted to be connected with a tractor and shiftably connected with said pole, and a spring cushion stop carried by said part, said spring cushion stop including a casing attached to said part, and disposed generally in longitudinal alignment with said plunger, one end of said casing being open and the other end being apertured, a cushion spring disposed within said casing and seated at one end against the apertured end of said casing, a spring mounting block receiving the other end of said cushion spring and disposed in the open end of said casing, a bolt threaded through said block and extending at one end through said spring and out of said casing aperture, a spacing sleeve disposed within said spring about said bolt and extending from said mounting block through said casing aperture, an abutment washer on said bolt and disposed against the outer side of the apertured end of said casing, a fastener locking said abutment washer against the outer end of said spacing sleeve, the length of the latter determining the amount of compression preloaded in said spring, and means mounting said casing on said shiftable part so as to cause the other end of said bolt to engage said brake-applying plunger when said part is moved toward said brake-applying means, as when the trailer, wagon or the like overruns the tractor.

5. In a hydraulic surge brake system for trailers, wagons and the like including a pole connected to the trailer, wagon or the like and carrying brake-applying means including a plunger, the improvement comprising a brake actuator including a casing open at one end and closed at the other end, a spring disposed in said casing and seated in said closed end, the latter having an aperture, a spring mounting block receiving the other end of said cushion spring and disposed in the open end of said casing, a bolt threaded through said block and extending at one end through said spring and out of said casing aperture, a spacing sleeve disposed within said spring about said bolt and extending from said mounting block through said casing aperture, an abutment washer on said bolt and disposed against the outer side of the apertured end of said casing, a fastener locking said abutment washer against the outer end of said spacing sleeve, the length of the latter determining the amount of compression preloaded in said spring, the other end of said spring being adapted to engage said plunger to actuate said brake-applying means.

6. In a hydraulic surge brake system for trailers, wagons and the like including a pole connected to the trailer, wagon or the like and carrying brake-applying means including a plunger, the improvement comprising a part adapted to be connected with a tractor and shiftably connected with said pole, a plunger-engaging unit including a part having a pair of apertured attaching sections spaced to embrace said first mentioned part, and attaching means on said second mentioned part generally midway between the upper and lower faces of said first mentioned part whereby said unit may be mounted on either the upper or lower side of said first mentioned part, optionally.

7. In a hydraulic surge brake system for trailers, wagons and the like including a pole connected to the trailer, wagon or the like and carrying brake-applying means including a plunger, the combination comprising a part adapted to be connected with a tractor and shiftably connected with said pole, said part surrounding said pole and including a portion extending forwardly of said pole, a plunger-engaging stop releasably mounted on said forwardly extending portion in a position to engage said plunger and actuate said brake-applying means upon movement of said part relative to said pole, said forwardly extending portion being apertured transversely generally midway between the upper and lower portions of said forwardly extending part, and means releasably connecting said stop with said forwardly extending portion comprising a pair of apertured side sections spanning said forwardly extending portion, the apertures in said side sections being located so as to align with the transverse aperture in said forwardly extending portion in either an upper and a lower position of said stop on said forwardly extending portion, and means extending through the apertures in said side sections and said forwardly extending portion for fixing said stop in optionally upper or lower positions on said forwardly extending portion.

References Cited in the file of this patent

UNITED STATES PATENTS

| | | |
|---|---|---|
| 275,146 | Clark | Apr. 3, 1883 |
| 2,125,702 | Watson | Aug. 2, 1938 |
| 2,158,175 | Coppola et al. | May 16, 1939 |
| 2,320,585 | Gill et al. | June 1, 1943 |
| 2,354,268 | McNamara | July 25, 1944 |
| 2,388,336 | Miller | Nov. 6, 1945 |
| 2,483,074 | Swain | Sept. 27, 1949 |
| 2,642,961 | Teal | June 23, 1953 |
| 2,704,585 | Stromberg | Mar. 22, 1955 |
| 2,779,443 | Tucker | Jan. 29, 1957 |

FOREIGN PATENTS

| | | |
|---|---|---|
| 519,088 | Canada | Dec. 6, 1955 |